US012519200B2

(12) United States Patent
Mishra et al.

(10) Patent No.: US 12,519,200 B2
(45) Date of Patent: Jan. 6, 2026

(54) MINIATURIZED WIDEBAND 3-WAY SPLITTERS FOR ULTRA-DENSE QUASI-OMNI BASE STATION ANTENNAS

(71) Applicant: John Mezzalingua Associates, LLC, Liverpool, NY (US)

(72) Inventors: Ghanshyam Mishra, Liverpool, NY (US); Evan Wayton, Tully, NY (US)

(73) Assignee: John Mezzalingua Associates, LLC, Liverpool, NY (US)

( * ) Notice: Subject to any disclaimer, the term of this patent is extended or adjusted under 35 U.S.C. 154(b) by 129 days.

(21) Appl. No.: 18/687,642

(22) PCT Filed: Sep. 1, 2022

(86) PCT No.: PCT/US2022/075825

§ 371 (c)(1),
(2) Date: Feb. 28, 2024

(87) PCT Pub. No.: WO2023/034907

PCT Pub. Date: Mar. 9, 2023

(65) Prior Publication Data

US 2024/0363990 A1 Oct. 31, 2024

Related U.S. Application Data

(60) Provisional application No. 63/239,684, filed on Sep. 1, 2021.

(51) Int. Cl.
*H01P 5/12* (2006.01)
*H01Q 1/38* (2006.01)
*H01Q 21/20* (2006.01)

(52) U.S. Cl.
CPC ................ *H01P 5/12* (2013.01); *H01Q 1/38* (2013.01); *H01Q 21/20* (2013.01)

(58) Field of Classification Search
CPC ............ H01P 5/12; H01Q 1/38; H01Q 21/20
See application file for complete search history.

(56) References Cited

U.S. PATENT DOCUMENTS 4,901,042 A 2/1990 Terakawa et al.
5,126,704 A 6/1992 Dittmer et al.
(Continued)

FOREIGN PATENT DOCUMENTS

CN 108493551 A 9/2018
WO 2020110001 A1 6/2020

OTHER PUBLICATIONS

International Search Report and Written Opinion, dated Dec. 23, 2022, received in connection with corresponding International Patent Application No. PCT/US2022/075825.
(Continued)

*Primary Examiner* — Andrea Lindgren Baltzell
*Assistant Examiner* — Kimberly E Glenn
(74) *Attorney, Agent, or Firm* — Meunier Carlin & Curfman LLC

(57) ABSTRACT

Disclosed is a splitter for use in an ultra-dense multi-band antenna. The splitter comprises a first twelfth-wave transformer and a second twelfth-stage transformer coupled serially. The first twelfth-wave transformer stage has a split and two parallel paths, each of the two parallel paths having a meander structure, and wherein the second twelfth-wave transformer stage has a splitter junction and a plurality of splitter branches. By splitting the input to the first twelfth-wave transformer stage into two parallel paths, it is possible to provide a controlled input impedance while providing meander lines that are compact and thus take up less real estate on a PCB (Printed Circuit Board).

13 Claims, 12 Drawing Sheets

(56) References Cited

U.S. PATENT DOCUMENTS

| | | | |
|---|---|---|---|
| 5,634,208 | A | 5/1997 | Nishikawa et al. |
| 2007/0216494 | A1 | 9/2007 | McKinley et al. |
| 2012/0086519 | A1 | 4/2012 | Hauer et al. |
| 2018/0069287 | A1 | 3/2018 | Sherrer et al. |
| 2020/0388900 | A1 | 12/2020 | Chueh |
| 2021/0151850 | A1 | 5/2021 | Yoshioka et al. |

OTHER PUBLICATIONS

Extended European Search Report, dated Jun. 23, 2025, received in connection with corresponding EP Patent Application No. 22865796.1.

MINIATURIZED WIDEBAND 3-WAY SPLITTERS FOR ULTRA-DENSE QUASI-OMNI BASE STATION ANTENNAS

CROSS REFERENCE TO RELATED APPLICATIONS

This is a U.S. National Stage application filed under 35 U.S.C. § 371 of PCT/US2022/075825, filed on Sep. 1, 2022, which application claims the priority benefit of and is a non-provisional of U.S. Provisional Application Ser. No. 63/239,684, filed Sep. 1, 2021, which application is hereby incorporated by this reference in its entirety for all purposes as if fully set forth herein.

BACKGROUND OF THE INVENTION

Field of the Invention

The present invention relates to wireless communications, and more particularly, to compact multi-band cellular antennas.

Related Art

The increasing efficiency of wireless communications has led to a consistent demand to increase the number of ports and improve the gain of multi-band quasi-omni base station antennas (BSAs) without increasing the antenna volume. One of the essential components of advanced quasi-omni BSAs is an n-way power splitter (divider), where n is an integer. Each port of the quasi-omni antenna requires an 'n-way power splitter' which divides the input power n-ways with equal amplitude and phase. For instance, a 24-port quasi-omni BSA requires twenty-four 3-way power splitters to achieve a quasi-omni pattern, wherein the quasi-omnidirectional pattern is achieved using three panels forming an equilateral triangle.

Traditional wideband 3-way power splitters require printed circuit boards (PCBs) that occupy significant area, which limits there use on the reflector panels of ultra-dense quasi-omni BSAs.

FIG. 1 illustrates a conventional low-band (LB) 3-way power splitter: FIG. 2 illustrates a conventional mid-band (MB) 3-way power splitter 200; and FIG. 3 illustrates a conventional 3-way power splitter 300 for CBRS (Citizens Broadband Radio Service) frequency bands. Each of splitters 100/200/300 are illustrated with typical dimensions. Each of these conventional power splitters 100/200/300 can take up a significant area on the panel of an ultra-dense quasi-omni antenna.

Conventional splitters 100/200/300 rely on the concept of a branch-line type divider, which consists of three output lines branching in parallel from an input line. The splitters 100/200/300 require matching networks such as quarter-wavelength transformers because the characteristic impedance of the input line differs from that of the parallel combination of the output lines. Conventional splitters 100/200/300 each require a two-stage matching transformer 105/205/305 to achieve wide bandwidth. Conventional approaches employ quarter-wave transformers, as illustrated in FIGS. 2 and 3. The use of conventional twelfth-wave transformers are also known, as illustrated in FIG. 1, in which splitter 100 has a first stage 115 that uses a twelfth-wave transformer, and a second stage 120 that uses a quarter-wave transformer, whereby the first stage 115 and second stage 120 boundary occurs at the splitter junction 125. However, a conventional twelfth-wave transformer, as illustrated in FIG. 1, has a very thick trace that takes up considerable PCB real estate in a meander configuration. Conventional MB 3-way power splitter 200 has a first stage quarter-wave transformer 215 and a second stage quarter-wave transformer 220, whereby the first stage 215 and second stage 220 boundary occurs at the splitter junction 225. And conventional CBRS 3-way power splitter 300 has a first stage quarter-wave transformer 315 and a second stage quarter-wave transformer 320, whereby the first stage 315 and second stage 320 boundary occurs at the splitter junction 325.

The addition of the two stages of conventional transformers increases bandwidth as well as the overall size of 3-way splitter 100/200/300. Due to the limited space on the panels of the antenna, some of the splitters will need to be either placed on the inside of the panel or as a different sub-layer in the cable tower. Both solutions limit the accessibility once the antenna is assembled. Particularly, if any re-work needs to be taken place or if a faulty component needs to be replaced the PCB cannot be removed due to lack of access to the solder joints. This is serious problem for cylindrical small cell antennas in which any solder joint which resides on the back of the PCB will be concealed from view, and not accessible due to the nature of the cylindrical array structure.

Accordingly, what is needed is a compact, precise, and reliable 3-way splitter that can be integrated within a dense multiband antenna while minimizing space.

SUMMARY OF THE DISCLOSURE

An aspect of the present disclosure involves a splitter for an ultra-dense antenna, the splitter having a PCB on which are formed components. The components comprise an input launch: a conductive trace coupled to the input launch, wherein the conductive trace is configured to form a first twelfth-wave transformer stage and a second twelfth-wave transformer stage that is coupled to the first twelfth-wave transformer stage, wherein the first twelfth-wave transformer stage has a split and two parallel paths, each of the two parallel paths having a meander structure, and wherein the second twelfth-wave transformer stage has a splitter junction and a plurality of splitter branches; and a plurality of output launches, each of the plurality of output launches coupled to a corresponding splitter branch of the plurality of splitter branches.

DESCRIPTION OF EXEMPLARY EMBODIMENTS

Disclosed is a highly compact, low cost, wide bandwidth two-stage 3-way splitter for use in an ultra-dense quasi-omni BSA. The proposed miniaturized 3-way splitter PCBs for each of the LB, MB, and CBRS bands are at least 40% more compact than conventional 3-way splitters. The disclosure combines a twelfth-wave transformer having parallel folded microstrip lines at the input to provide for 50 ohm input impedance and help miniaturize the 3-way splitter PCBs. This modified twelfth-wave transformer is used as a substitute for conventional transformers and results in reduction in length by approximately 33% compared to a quarter-wave transformer. The disclosed miniaturized splitters enable the PCBs to be placed on the same panel as the antenna array and feed boards, thereby providing accessibility to all the solder joints which improves manufacturability on an ultra-dense quasi-omni BSA.

Disclosed are six exemplary 3-way splitters. A common aspect of each of these is that they provide for broad bandwidth by using two twelfth-wave transformer stages in series, whereby the input twelfth-wave transformer stage allows for meandering by using split parallel leads which provide for the same impedance control as a single meander line, but with closely spaced meandering by having thinner parallel leads. In an example, each of the six exemplary 3-way splitters are matched to 50 ohm input and output impedances.

The two-stage impedance transformers are twelfth-wave transformers, wherein each stage of the transformer has two twelfth-wave transmission line sections. The first twelfth-wave transformer stage has a split and two parallel paths, each of the two parallel paths having a meander structure. The second twelfth-wave transformer stage is coupled to the first stage, wherein the second twelfth-wave transformer stage has a splitter junction and a plurality of splitter branches. Finally, each of the splitter branches are connected to corresponding 50 ohm output launches through 50 ohm transmission line sections. Using high impedance parallel-folded lines and shorter twelfth-wave sections, it is possible to more easily meander each input stage transformer section. Accordingly, different sections of the twelfth-wave transformer stages can be split and placed before the splitter junction or after the junction.

Figure 1:
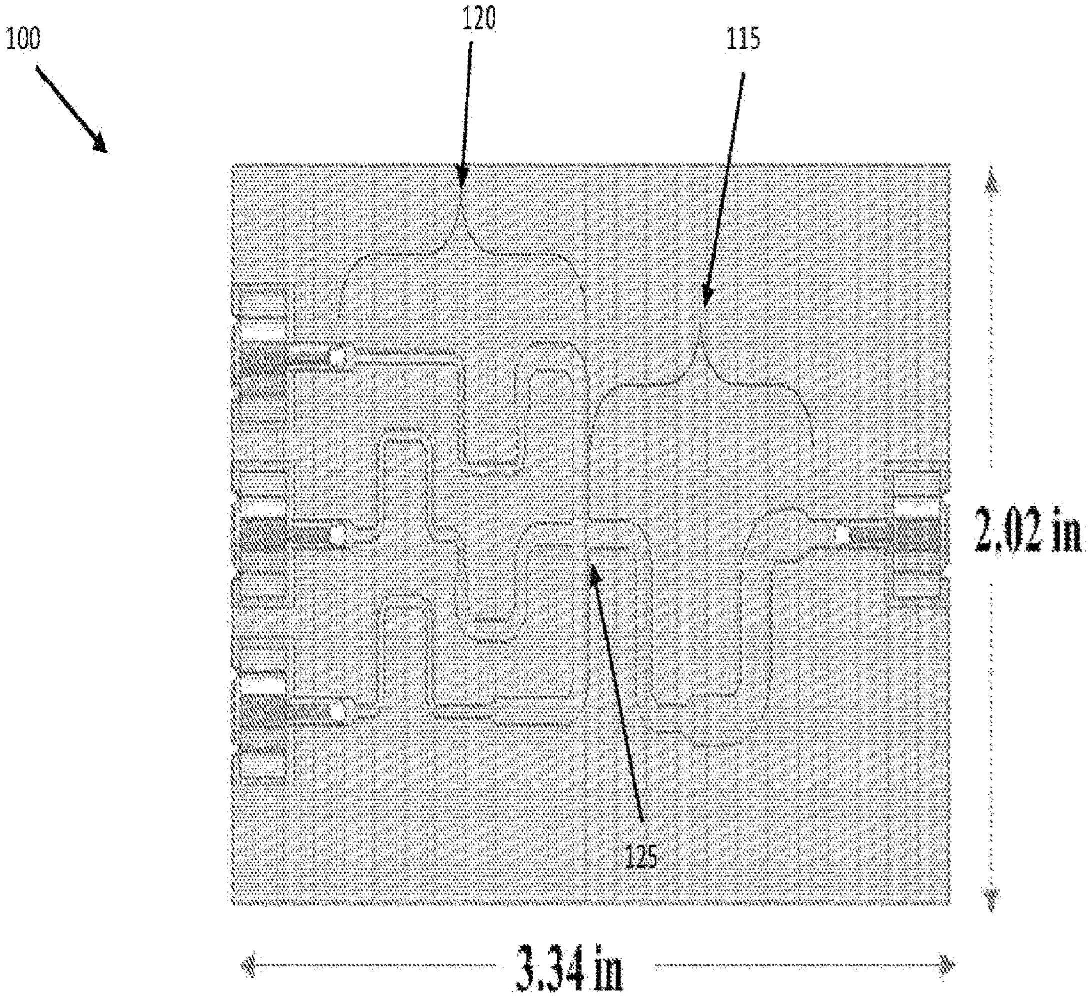
FIG. 1 illustrates a conventional low-band (LB) 3-way power splitter.
Figure 2:
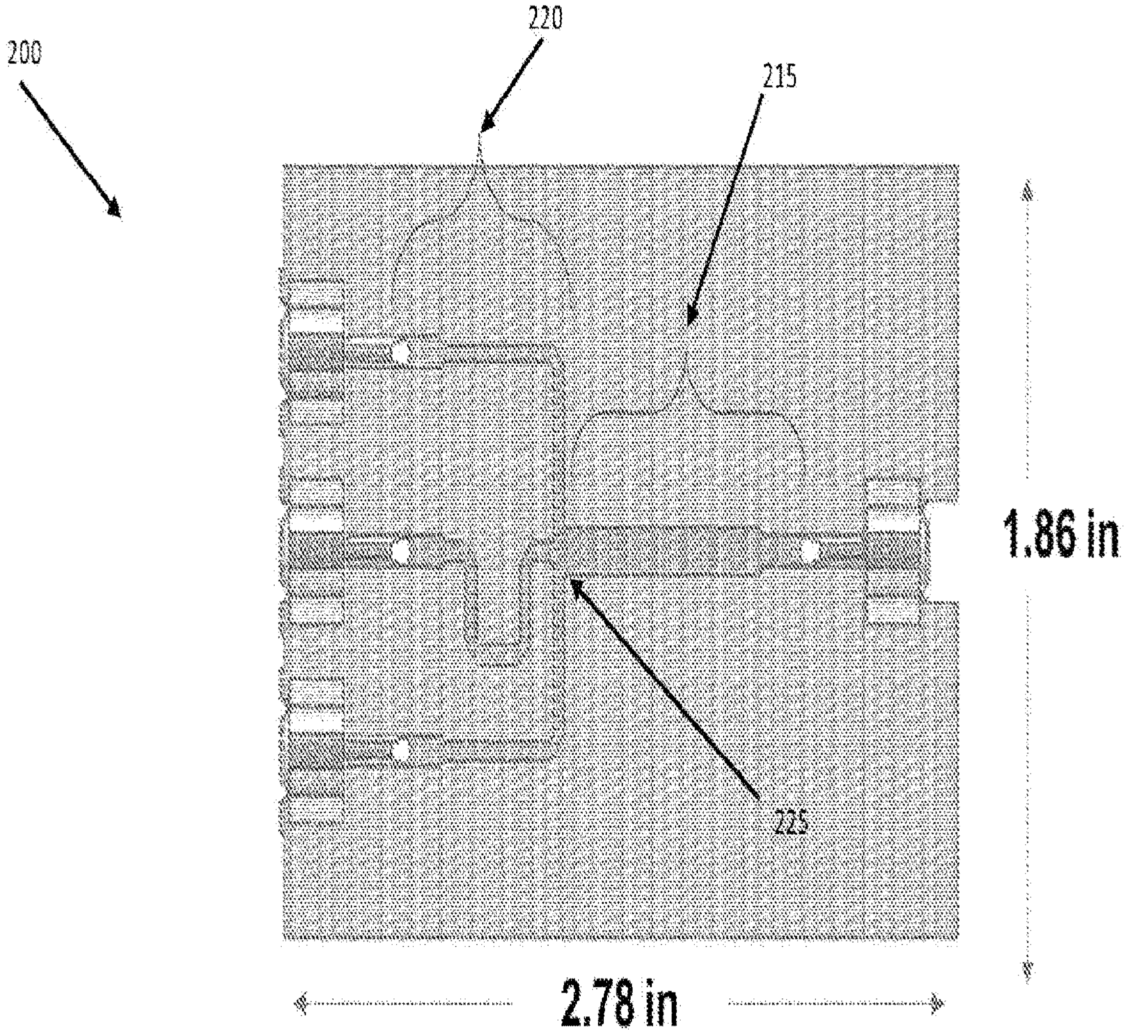
FIG. 2 illustrates a conventional mid-band (MB) 3-way power splitter.
Figure 3:
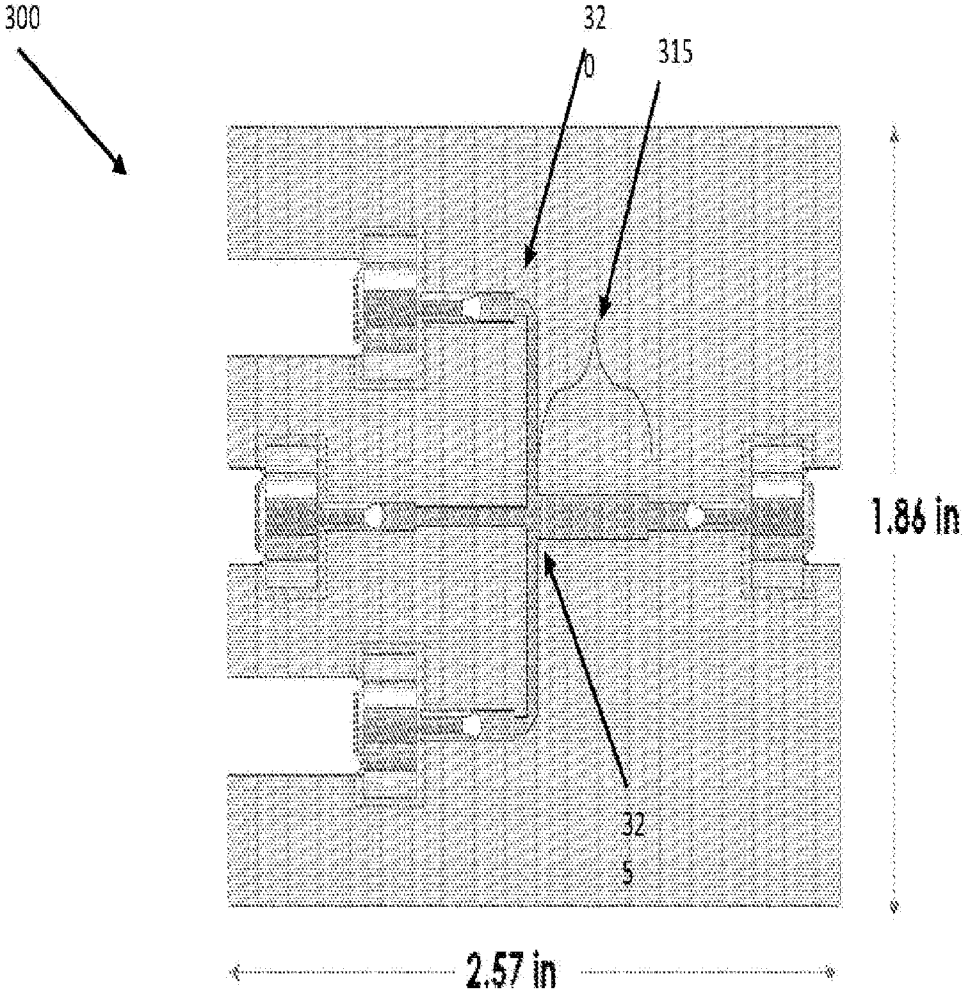
FIG. 3 illustrates a conventional CBRS (Citizens Broadband Radio Service) band 3-way power splitter.
Figure 4A:
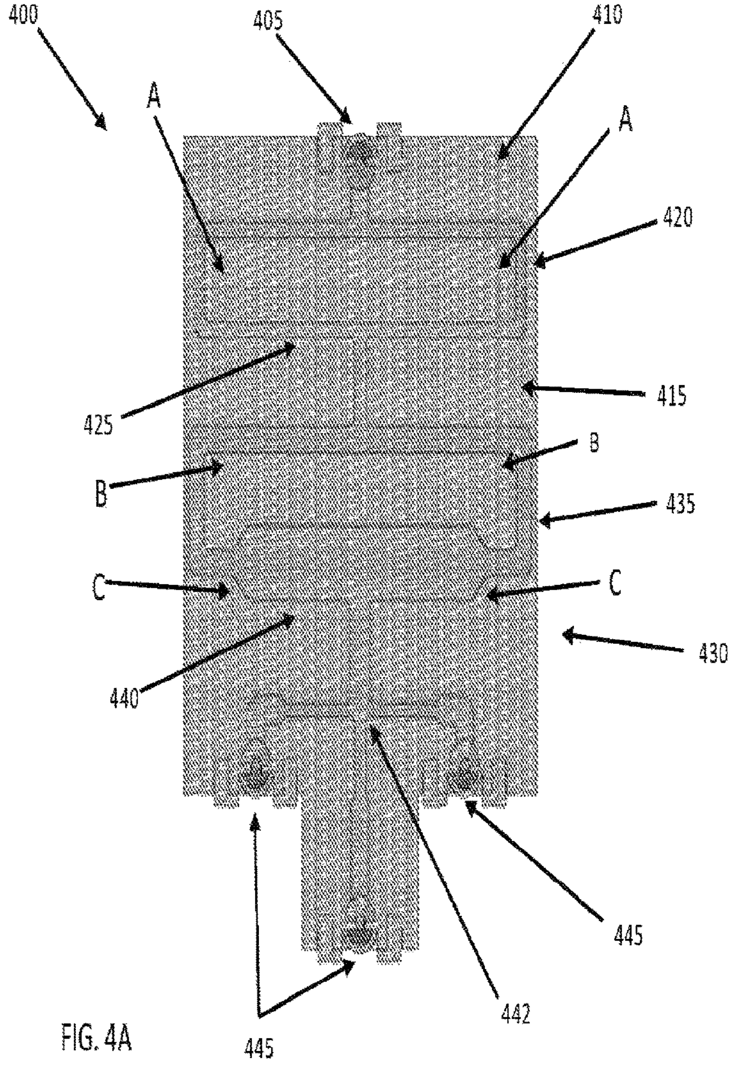
FIG. 4A illustrates an exemplary LB 3-way splitter having vertical launches.

FIG. 4A illustrates an exemplary LB 3-way splitter 400 having vertical launches: vertical launch input 405 that feeds a 50 ohm transmission line, and a plurality of 50 ohm vertical launch outputs 445. Vertical launch LB 3-way splitter 400 has a PCB (Printed Circuit Board) 410, on which is disposed a conductive trace to form a first stage twelfth-wave transformer 415 and a second stage twelfth-wave transformer 430. First stage twelfth-wave transformer 415 has a first transformer section 420 and a second transformer section 425, which have a transition boundary defined by marker A. The combination of first stage first transformer section 420 and first stage second transformer section 425 has a split to form parallel traces having sharp meander turns that are permissible with narrow traces. This allows for a tighter more compact geometry of meander lines to achieve the first stage twelfth-wave transformer 415 using less PCB real estate than conventional approaches. Second stage twelfth-wave transformer 430 has a second stage first transformer section 435 and a second stage second transformer section 440, whereby second stage first transformer section 435 and second stage second transformer section 440 have a transition boundary defined by marker C, which occurs at the triangular taper where the trace widens for second stage second transformer section 440. The trace width at marker B makes a step change, providing for impedance tuning between first stage twelfth-wave transformer 415 and second stage twelfth-wave transformer 430. Accordingly, second stage twelfth-wave transformer 430 includes a splitter junction 442 and subsequent three branches, each of which terminates at a corresponding 50 ohm vertical launch output 445.

Figure 4B:
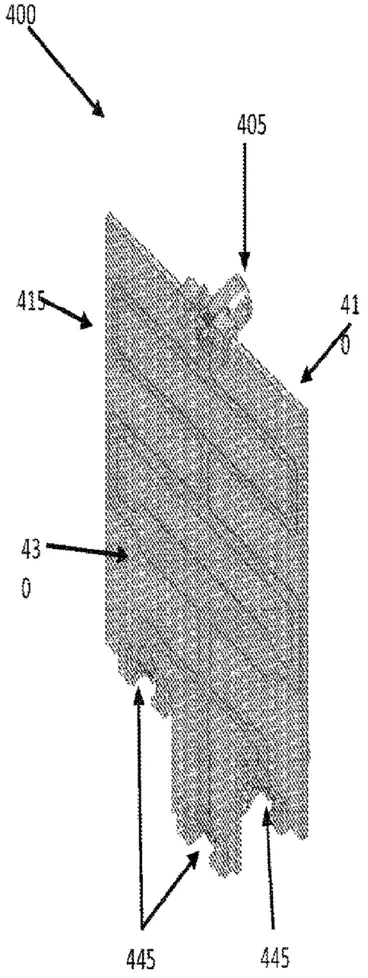
FIG. 4B is an iso view of the LB 3-way splitter of FIG. 4A.

FIG. 4B is an iso view of vertical launch LB 3-way splitter 400. Illustrated are PCB substrate 410; vertical launch input 405: vertical launch outputs 445: first stage twelfth-wave transformer 415 and second stage twelfth-wave transformer 430.

Figure 4C:
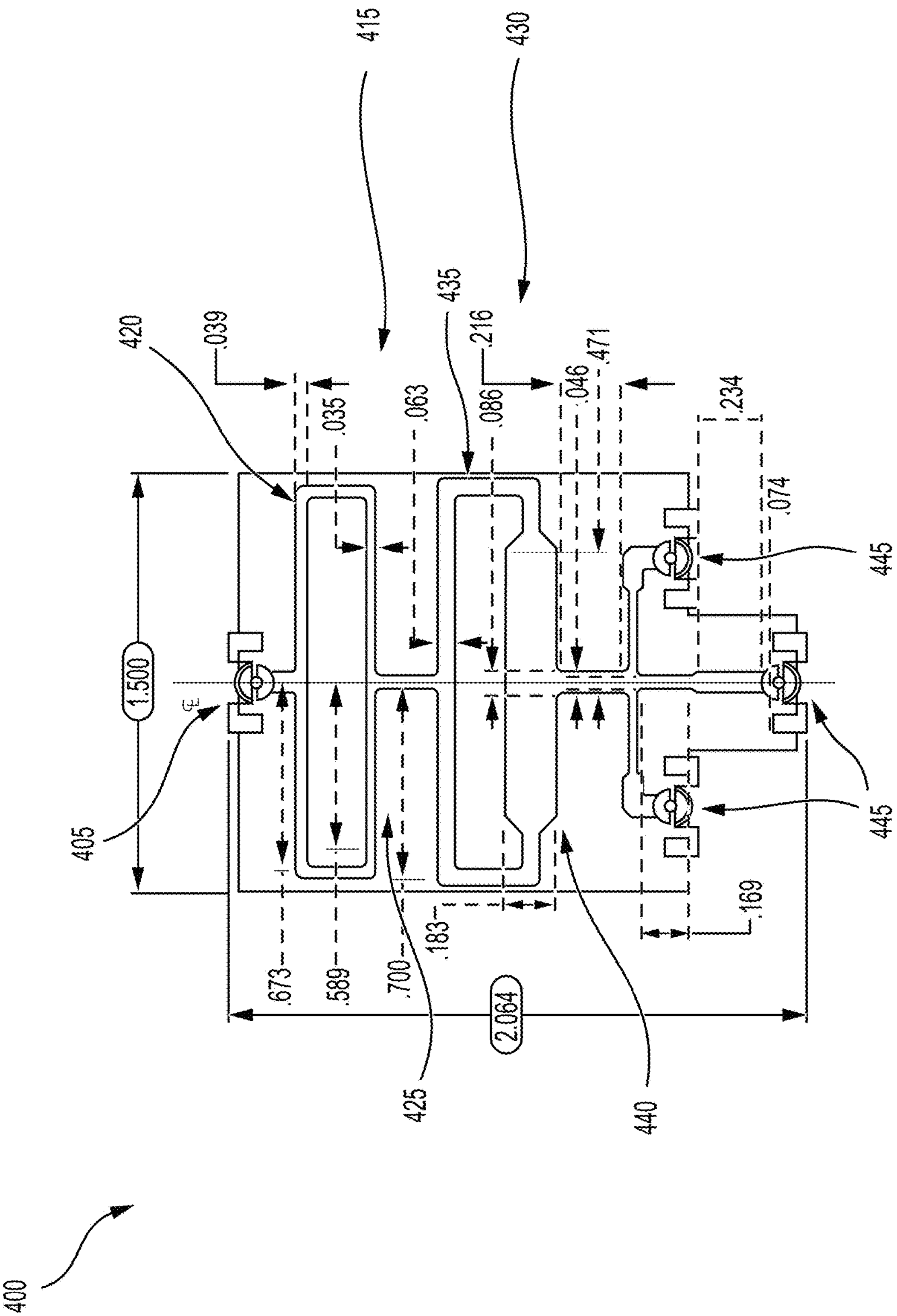
FIG. 4C is similar to the illustration of FIG. 4A, but with exemplary dimensions.

FIG. 4C is similar to the illustration of FIG. 4A, but with exemplary dimensions.

Figures 4D, 4E, 4F:
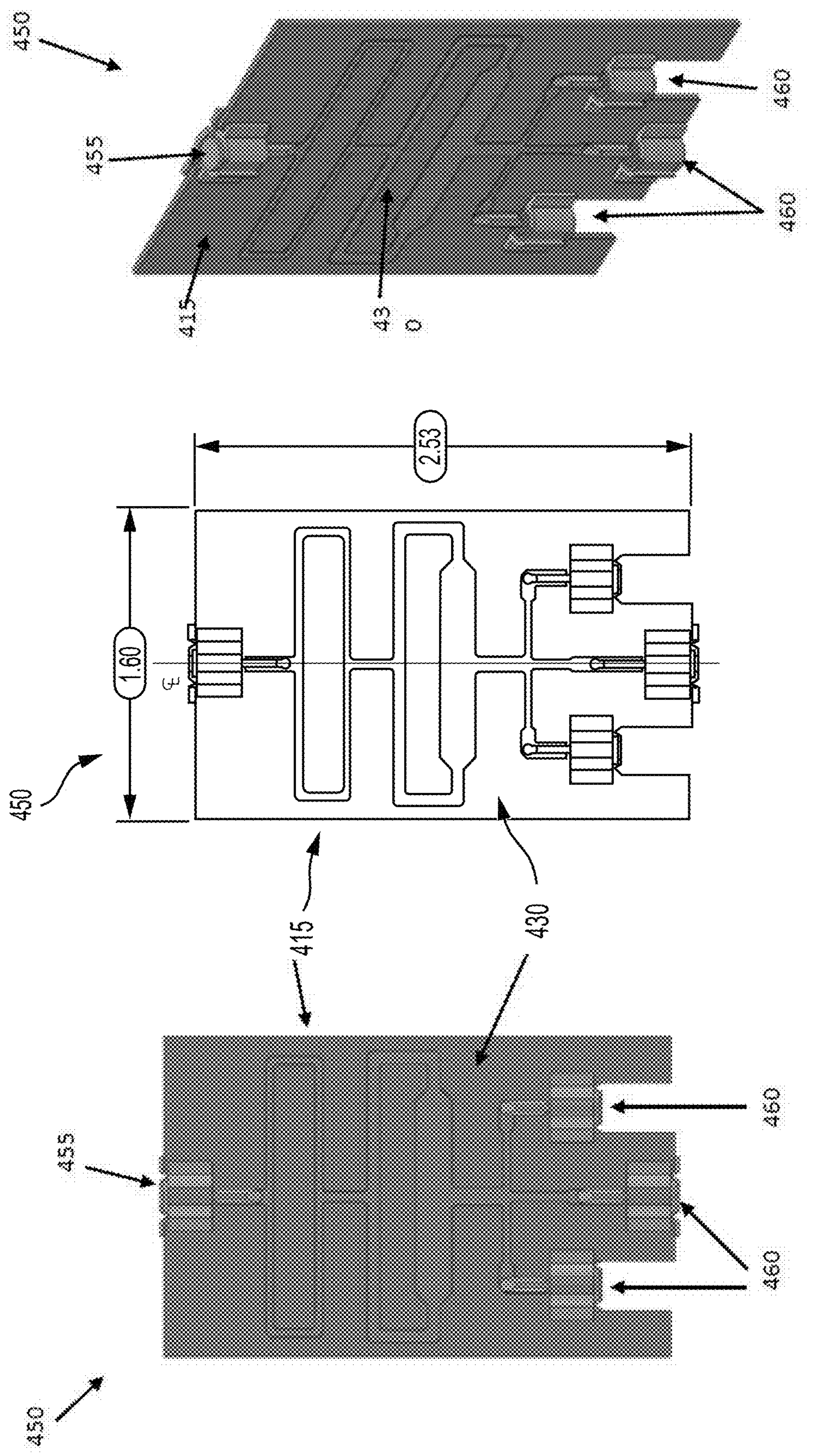
FIG. 4D illustrates an exemplary LB 3-way splitter having horizontal launches.
FIG. 4E is similar to the illustration of FIG. 4D, but with exemplary dimensions.
FIG. 4F is an iso view of the LB 3-way splitter of FIG. 4D.

FIG. 4D illustrates an exemplary LB 3-way splitter 450 having horizontal launches: horizontal launch input 455 and horizontal launch outputs 460. Horizontal launch LB 3-way splitter 450 may be substantially similar to vertical launch LB 3-way splitter 400, but with different RF launch input/outputs. As illustrated, first stage twelfth-wave transformer 415 and second stage twelfth-wave transformer 430 may be substantially similar or identical to the corresponding components of vertical launch LB 3-way splitter 400.

FIG. 4E is similar to the illustration of FIG. 4D, but with exemplary dimensions. Given that first stage twelfth-wave transformer 415 and second stage twelfth-wave transformer 430 may be identical to those of vertical launch 3-way splitter 400, the only dimensions illustrated are the PCB dimensions that are unique to horizontal launch 3-way LB splitter 450.

FIG. 4F is an iso view of horizontal launch LB 3-way splitter 450.

Figure 5A:
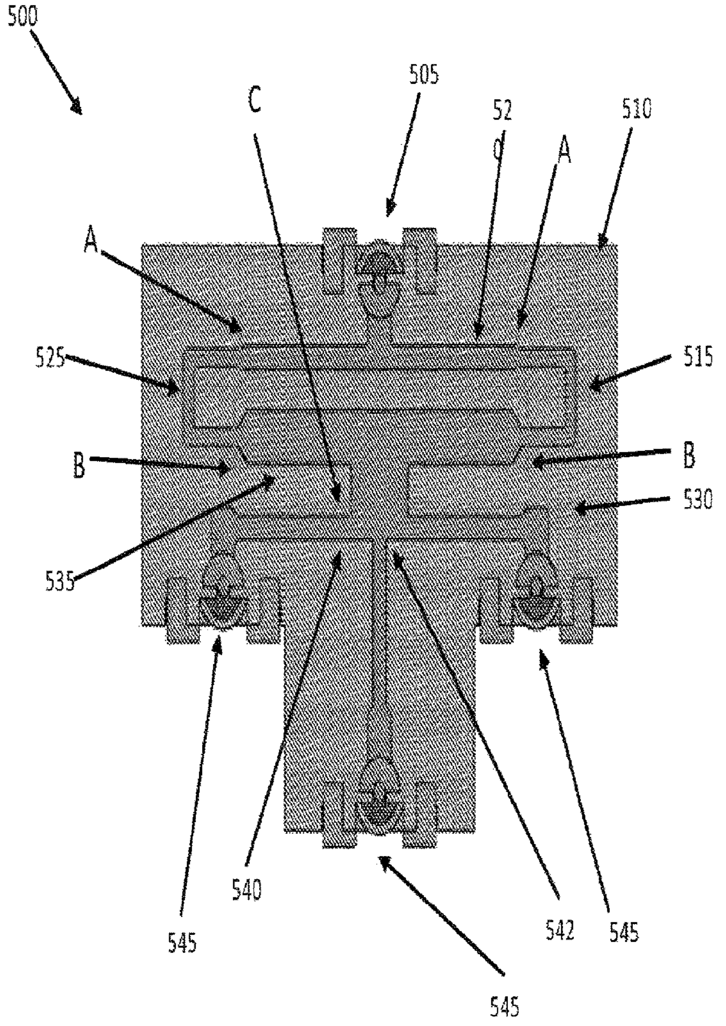
FIG. 5A illustrates an exemplary MB 3-way splitter having vertical launches.

FIG. 5A illustrates an exemplary MB 3-way splitter 500 having vertical launches: vertical launch input 505, and vertical launch outputs 545. Vertical launch MB 3-way splitter 500 has a PCB 510, on which are disposed conductive traces to form a first stage twelfth-wave transformer 515 and a second stage twelfth-wave transformer 530. As illustrated, the boundary between first stage twelfth-wave transformer 515 and a second stage twelfth-wave transformer 530 may occur at marker B. First stage twelfth-wave transformer 515 has a first stage first transformer section 520 and a first stage second transformer section 525, which have a transition boundary defined by marker A. The combination of first stage first transformer section 520 and first stage second transformer section 525 has a split to form parallel traces having sharp meander turns that are permissible with narrow traces.

Second stage twelfth-wave transformer 530 has a second stage first transformer section 535 and a second stage second transformer section 540, whereby second stage first transformer section 535 and second stage second transformer section 540 have a transition boundary defined by marker C, which occurs just before the splitter junction 542, whereby second stage second transformer section 540 includes the three branches that couple with each vertical launch output 545 through 50 ohm lines.

Figure 5B:
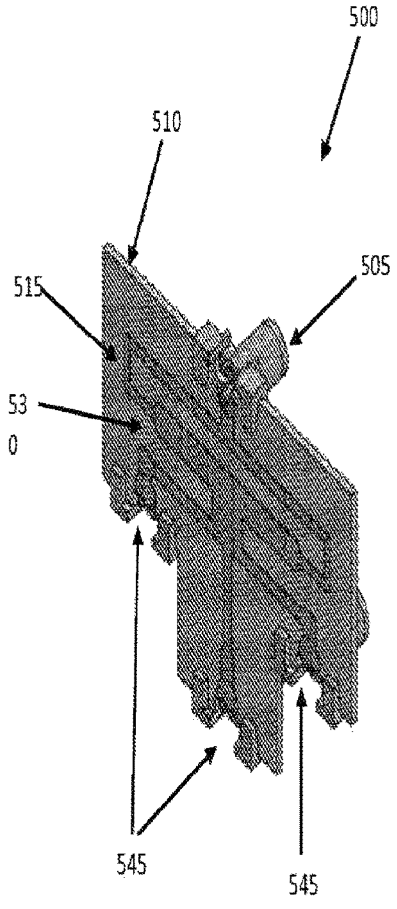
FIG. 5B is an iso view of the MB 3-way splitter of FIG. 5A.

FIG. 5B is an iso view of vertical launch MB 3-way splitter 500. Illustrated are PCB substrate 510; vertical launch input 505: vertical launch outputs 545; first stage twelfth-wave transformer 515 and second stage twelfth-wave transformer 530. This allows for a tighter more compact geometry of meander lines to achieve the first stage twelfth-wave transformer 515 using less PCB real estate than conventional approaches.

Figure 5C:
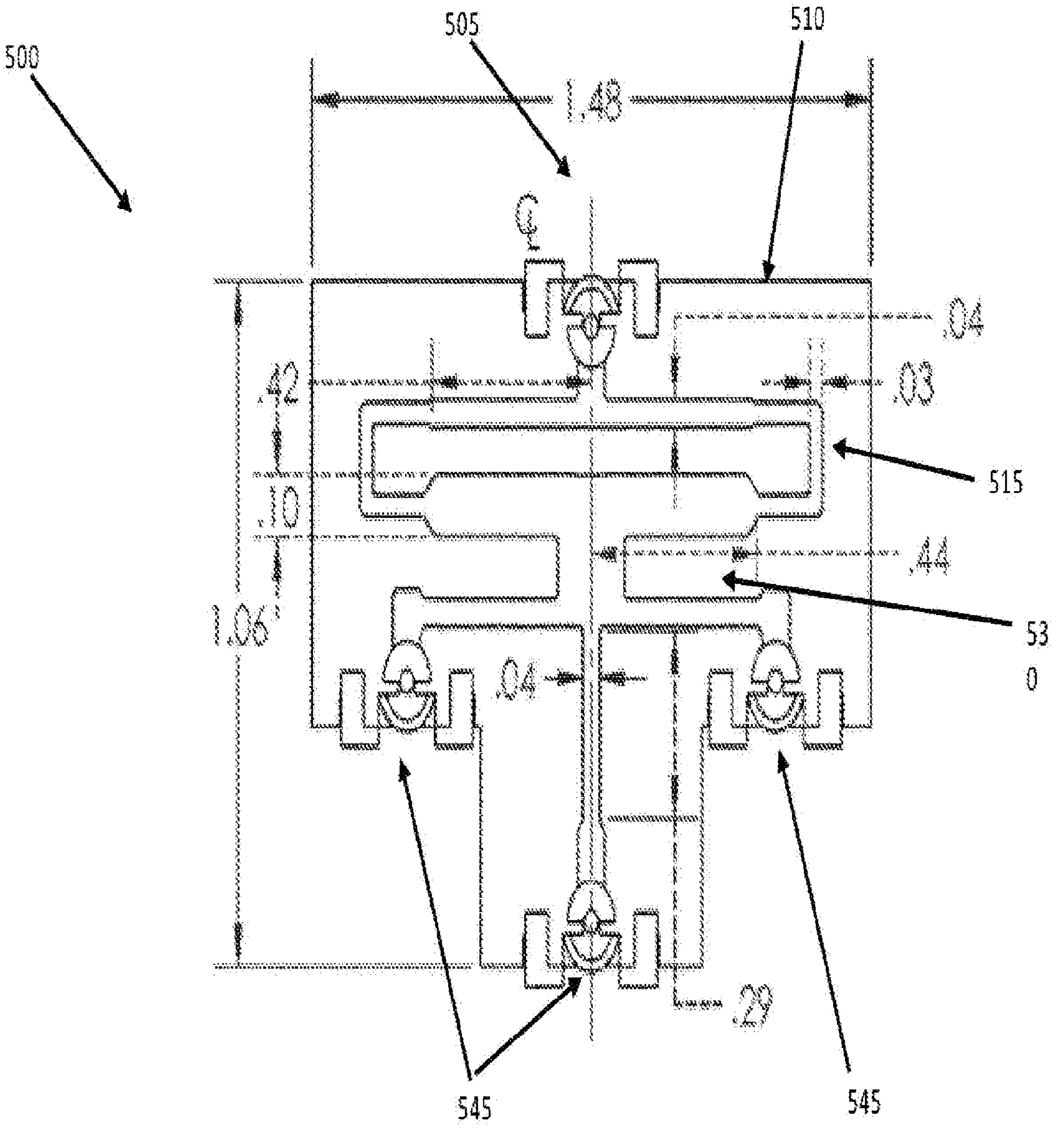
FIG. 5C is similar to the illustration of FIG. 5A, but with exemplary dimensions.

FIG. 5C is similar to the illustration of FIG. 5A, but with exemplary dimensions.

Figure 5F:
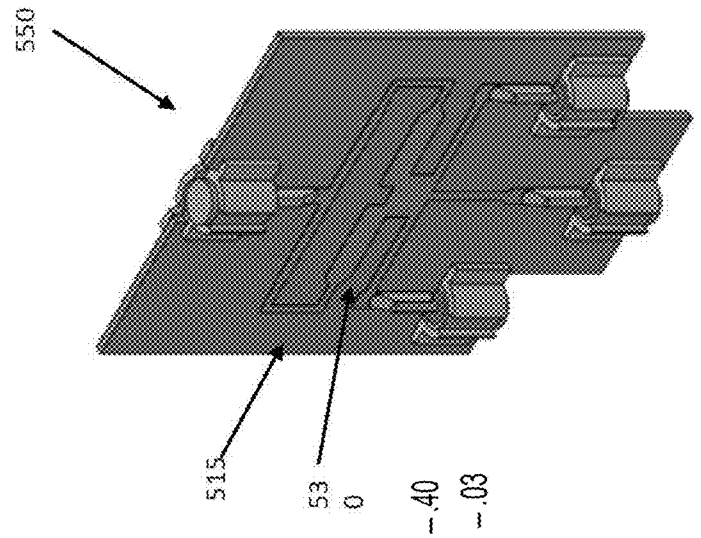
FIG. 5F is an iso view of the MB 3-way splitter of FIG. 5D.
Figure 5E:
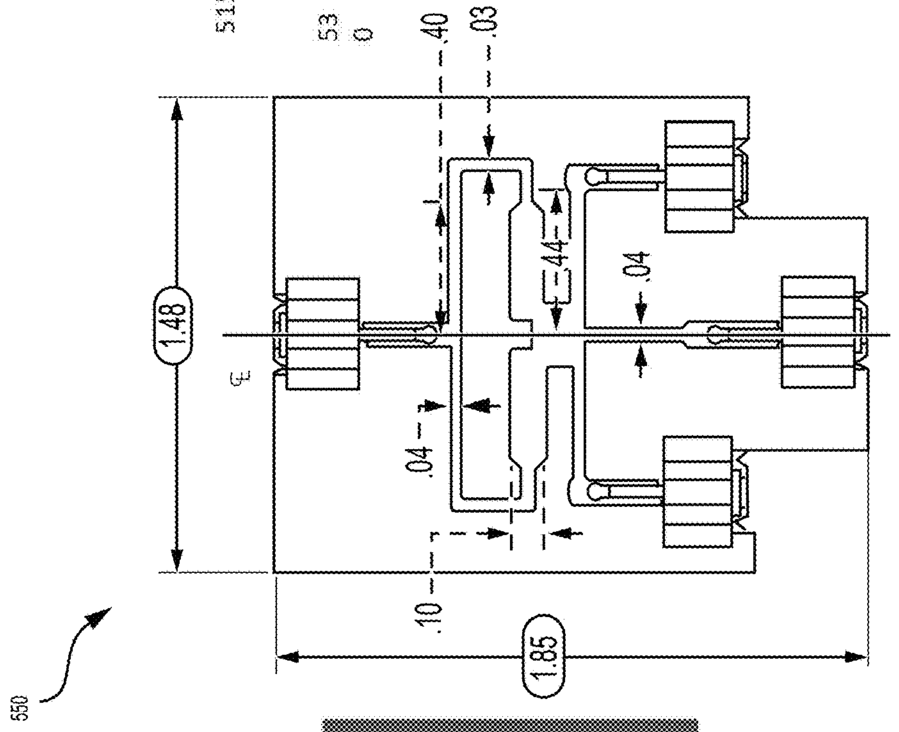
FIG. 5E is similar to the illustration of FIG. 5D, but with exemplary dimensions.
Figure 5D:
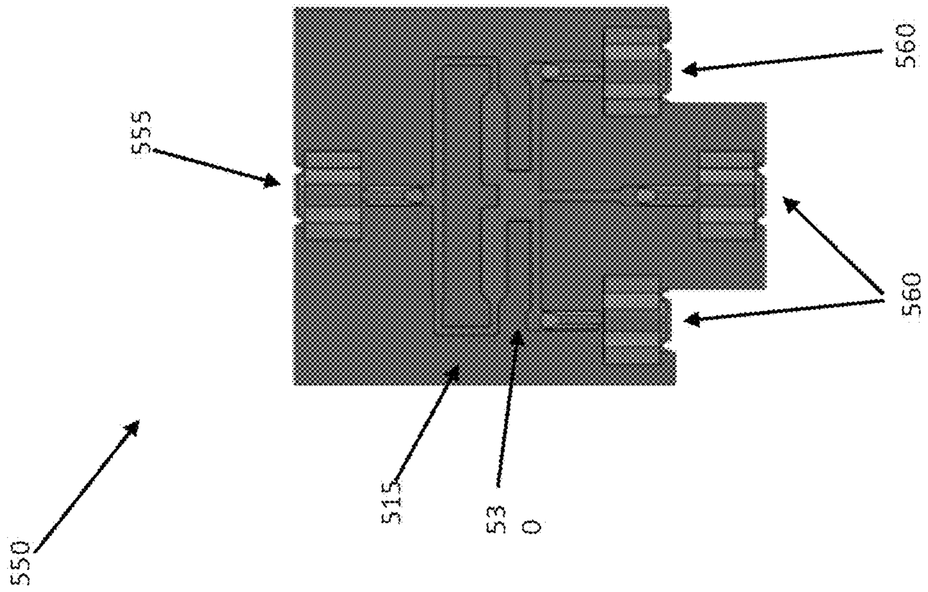
FIG. 5D illustrates an exemplary MB 3-way splitter having horizontal launches.

FIG. 5D illustrates an exemplary MB 3-way splitter 550 having horizontal launches: horizontal launch input 555, and horizontal launch outputs 560. Horizontal launch MB 3-way splitter 550 may be substantially similar to vertical launch MB 3-way splitter 500, but with horizontal launch input 555 and horizontal launch outputs 560. As illustrated, first stage twelfth-wave transformer 515 and second stage twelfth-wave transformer 530 may be substantially similar or identical to the corresponding components of vertical launch MB 3-way splitter 500.

FIG. 5E is similar to the illustration of FIG. 5D, but with exemplary dimensions. Given that the first stage twelfth-wave transformer 515 and second stage twelfth-wave transformer 530 may be identical to those of vertical launch MB 3-way splitter 500, the only dimensions illustrated are the PCB dimensions that are unique to horizontal launch MB 3-way splitter 550.

FIG. 5F is an iso view of horizontal launch MB 3-way splitter of 550.

Figure 6A:
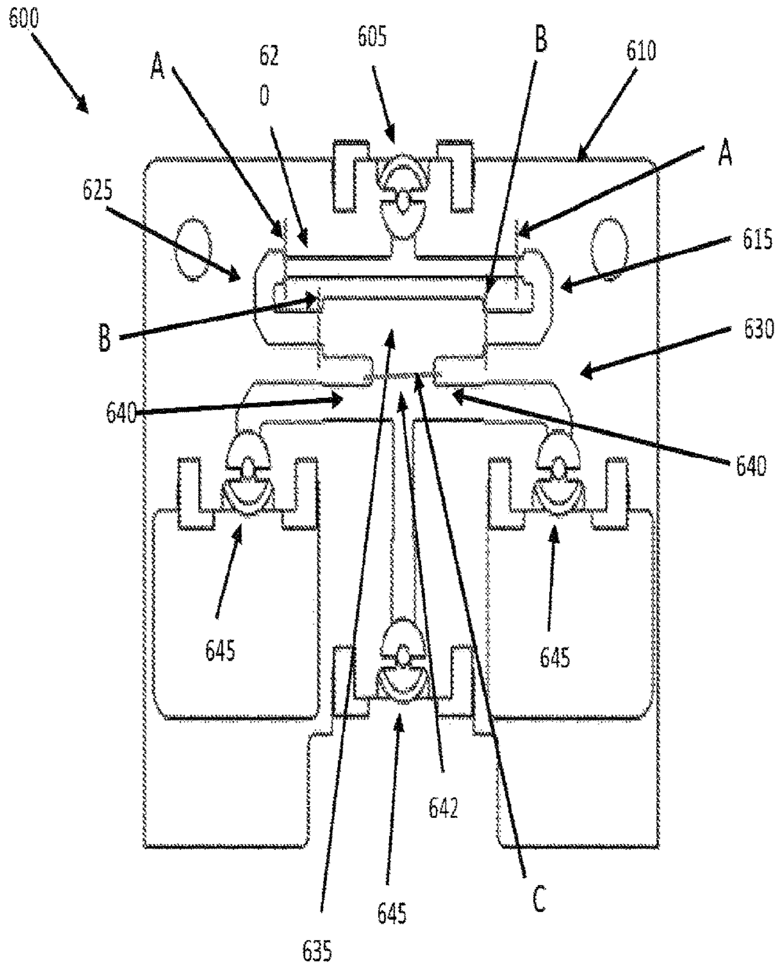
FIG. 6A illustrates an exemplary CBRS 3-way splitter having vertical launches.

FIG. 6A illustrates an exemplary CBRS 3-way splitter 600 having vertical launches: vertical launch input 605, and vertical launch outputs 645. Vertical launch CBRS 3-way splitter 600 has a PCB 610, on which are disposed conductive traces to form a first stage twelfth-wave transformer 615 and a second stage twelfth-wave transformer 630. As illustrated, the boundary between first stage twelfth-wave transformer 615 and a second stage twelfth-wave transformer 630 may occur at marker B. First stage twelfth-wave transformer 615 has a first stage first transformer section 620 and a first stage second transformer section 625, which have a transition boundary defined by marker A. The combination of first stage first transformer section 620 and first stage second transformer section 625 has a split to form parallel traces having sharp meander turns that are permissible with narrow traces.

Second stage twelfth-wave transformer 630 has a second stage first transformer section 635 and a second stage second transformer section 640, whereby second stage first transformer section 635 and second stage second transformer section 640 have a transition boundary defined by marker C, which occurs just before the splitter junction 642, whereby second stage second transformer section 640 includes the three branches that couple with each vertical launch output 645 through 50 ohm lines.

Figure 6B:
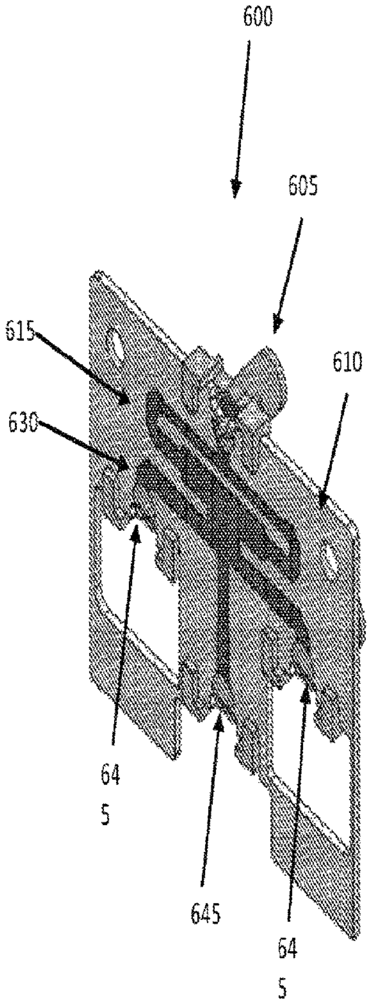
FIG. 6B is an iso view of the CBRS 3-way splitter of FIG. 6A.

FIG. 6B is an iso view of the CBRS 3-way splitter 600. Illustrated are PCB substrate 610; vertical launch input 605; vertical launch outputs 645: first stage twelfth-wave transformer 615 and second stage twelfth-wave transformer 630. This allows for a tighter more compact geometry of meander lines to achieve the first stage twelfth-wave transformer 615 using less PCB real estate than conventional approaches.

Figure 6C:
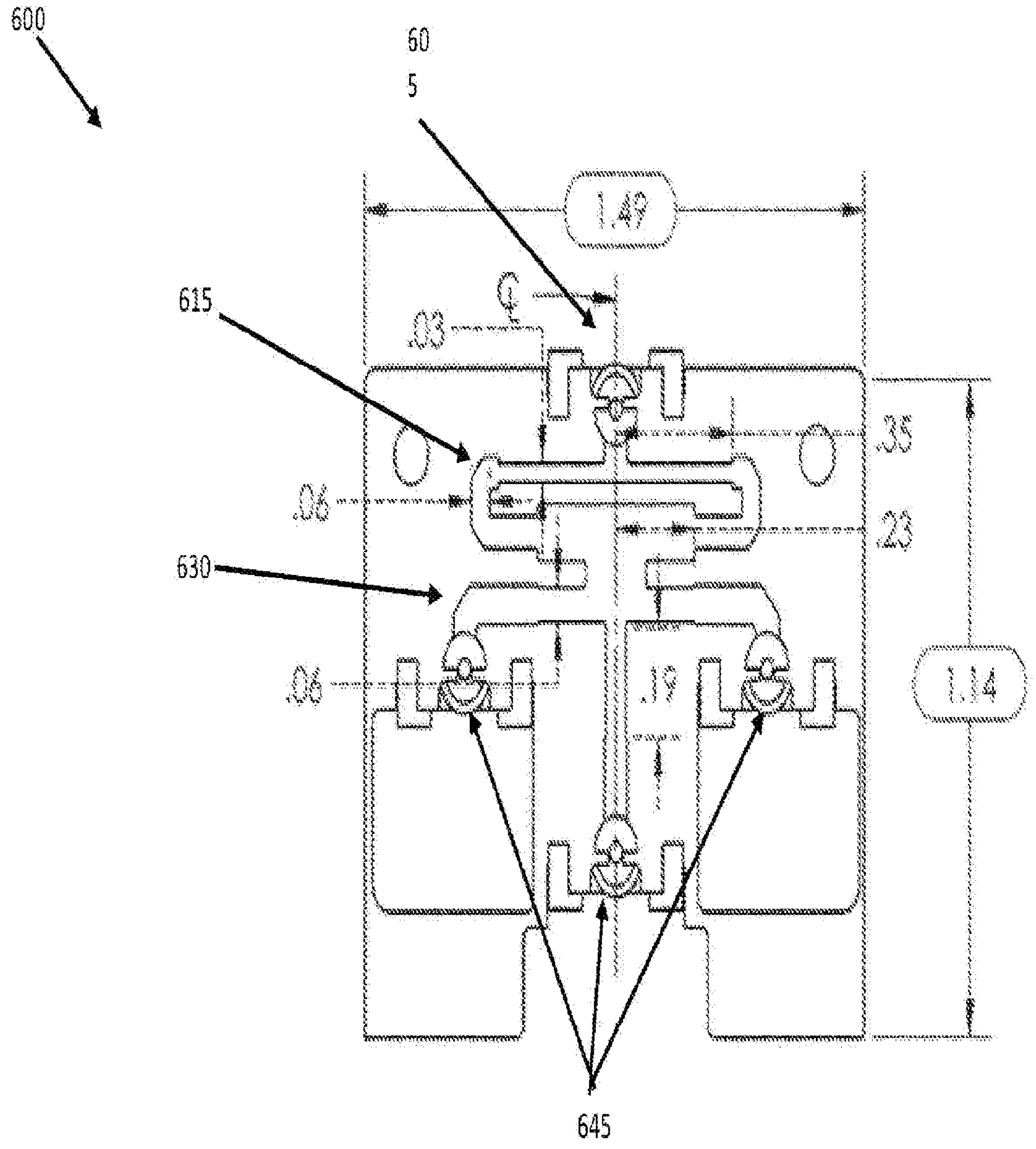
FIG. 6C is similar to the illustration of FIG. 6A, but with exemplary dimensions.

FIG. 6C is similar to the illustration of FIG. 6A, but with exemplary dimensions.

Figure 6F:
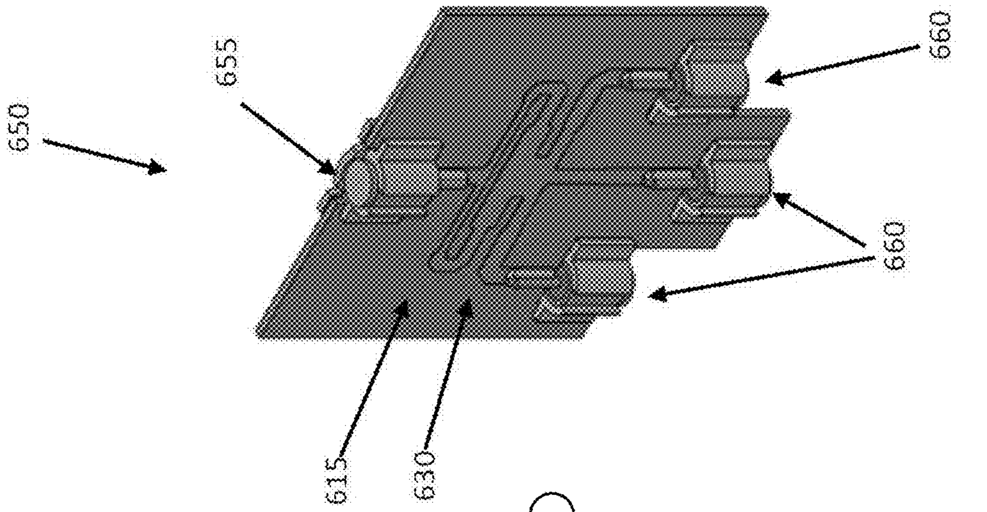
FIG. 6F is an iso view of the CBRS 3-way splitter of FIG. 6D.
Figure 6E:
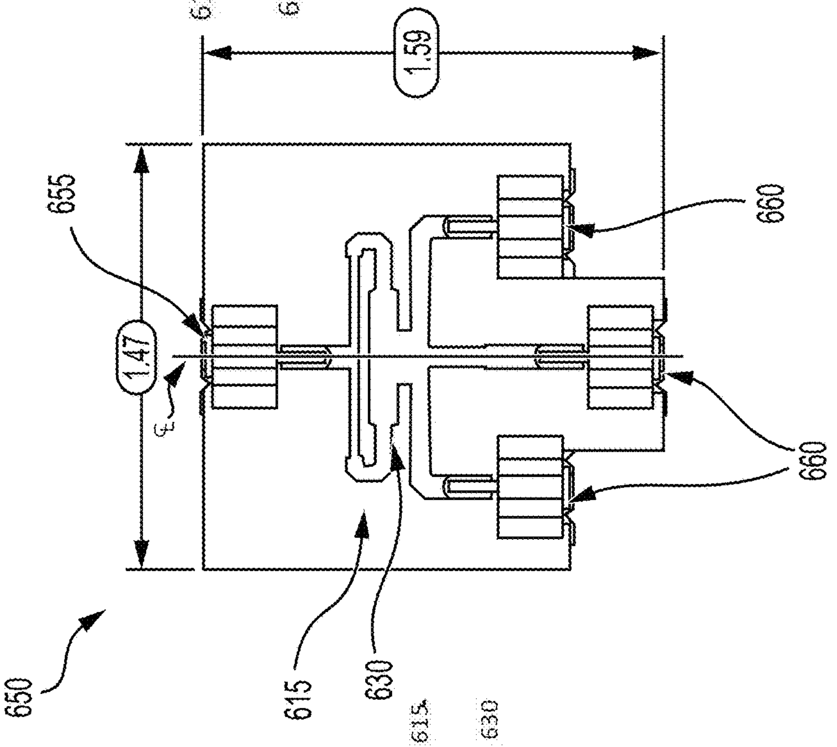
FIG. 6E is similar to the illustration of FIG. 6D, but with exemplary dimensions.
Figure 6D:
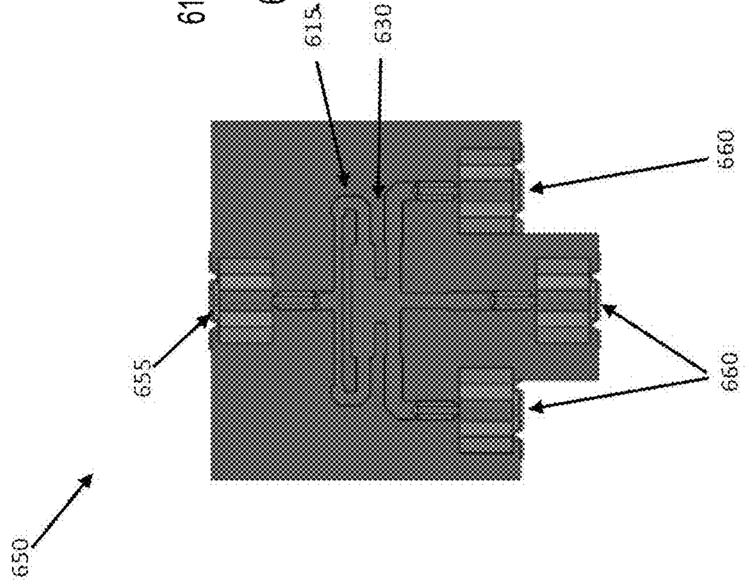
FIG. 6D illustrates an exemplary CBRS 3-way splitter having horizontal launches.

FIG. 6D illustrates an exemplary CBRS 3-way splitter 650 having horizontal launches: horizontal launch input 655 and horizontal launch outputs 660. Horizontal launch CBRS 3-way splitter 650 may be substantially similar to vertical launch CBRS 3-way splitter 600, but with horizontal launch input 655 and horizontal launch outputs 660. As illustrated, first stage twelfth-wave transformer 615 and second stage twelfth-wave transformer 630 may be substantially similar or identical to the corresponding components of vertical launch CBRS 3-way splitter 600.

FIG. 6E is similar to the illustration of FIG. 6D, but with exemplary dimensions. Given that the first stage twelfth-wave transformer 615 and second stage twelfth-wave transformer 630 may be identical to those of vertical launch CBRS 3-way splitter 500, the only dimensions illustrated are the PCB dimensions that are unique to horizontal launch CBRS 3-way splitter 550.

FIG. 6F is an iso view of horizontal launch CBRS 3-way splitter of 650.

Although the above disclosed embodiments feature 3-way splitters, it will be understood that an n-way splitter is possible, whereby n may be 2 or higher (potentially 6, etc.). It will be understood that such variations are possible and within the scope of the disclosure.

In further possible variations, more transformer stages may be added to increase the bandwidth as necessary. Given the space savings of the disclosed transformer stages, this may be accomplished with a reasonable increase in PCB size. Further, although the disclosed power splitters involve splitting power equally n ways, it will be understood that an unequal power splitter scheme is possible and within the scope of the disclosure. Additionally, each disclosed power splitter 400/450/500/550/600/650 may include one or more isolation resistors to create a miniaturized Wilkinson power divider over a broadband

What is claimed is:

1. A splitter for an ultra-dense antenna, the splitter having a PCB on which are formed components, the components comprising:

an input launch;

a conductive trace coupled to the input launch, wherein the conductive trace is configured to form a first twelfth-wave transformer stage and a second twelfth-wave transformer stage that is coupled to the first twelfth-wave transformer stage, wherein the first twelfth-wave transformer stage has a split and two parallel paths, each of the two parallel paths having a meander structure, and wherein the second twelfth-wave transformer stage has a splitter junction and a plurality of splitter branches; and a plurality of output launches, each of the plurality of output launches coupled to a corresponding splitter branch of the plurality of splitter branches.

2. The splitter of claim 1, wherein the plurality of splitter branches comprises three splitter branches.

3. The splitter of claim 1, wherein the first twelfth-wave transformer stage comprises:

a first stage first transformer section; and a first stage second transformer section.

4. The splitter of claim 3, wherein the first stage first transformer section and the first stage second transformer section have a first transition boundary that comprises a change in conductive trace width.

5. The splitter of claim 1, wherein the second twelfth-wave transformer stage comprises:

a second stage first transformer section; and a second stage second transformer section.

6. The splitter of claim 5, wherein the second stage first transformer section and the second stage second transformer section have a second transition boundary that comprises a change in conductive trace width.

7. The splitter of claim 1, wherein the splitter is configured to operate in a Low Band (LB) frequency band.

8. The splitter of claim 1, wherein the splitter is configured to operate in a Mid Band (MB) frequency band.

9. The splitter of claim 1, wherein the splitter is configured to operate in a Citizens Broadband Radio Service (CBRS) frequency band.

10. The splitter of claim 1, wherein the input launch comprises a vertical input launch.

11. The splitter of claim 10, wherein each of the plurality of output launches comprises a vertical output launch.

12. The splitter of claim 1, wherein the input launch comprises a horizontal input launch.

13. The splitter of claim 12, wherein each of the plurality of output launches comprises a horizontal output launch.

* * * * *